H. J. RUTHRAUFF.
Wash-Stand Water-Supply and Waste Arrangements.
No. 127,433.  Patented June 4, 1872.
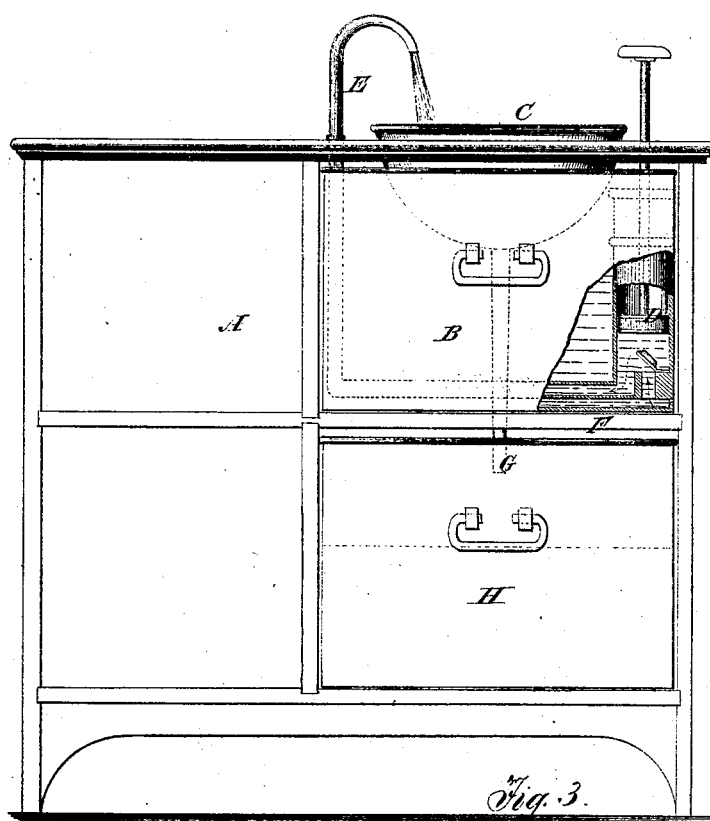
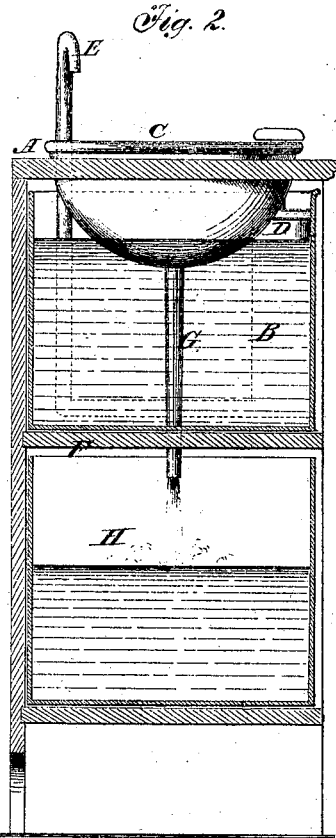
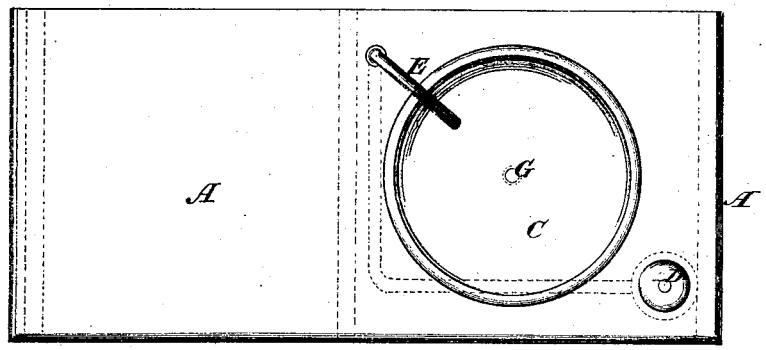

UNITED STATES PATENT OFFICE.

HENRY J. RUTHRAUFF, OF WARRENSBURG, MISSOURI.

IMPROVEMENT IN WASH-STAND WATER-SUPPLIES AND WASTE ARRANGEMENTS.

Specification forming part of Letters Patent No. 127,433, dated June 4, 1872.

Specification describing a new and Improved Wash-Stand, invented by HENRY J. RUTHRAUFF, of Warrensburg, in the county of Johnson and State of Missouri.

My invention consists of a wash-stand with a reservoir for clean water and one for the foul water, both below the basin, and a pump for raising the clean water to the basin, all as hereinafter described.

Figure 1 is a front elevation of my improved stand, with a part of the clean-water reservoir and the pump sectioned. Fig. 2 is a transverse sectional elevation, and Fig. 3 is a plan view.

Similar letters of reference indicate corresponding parts.

A is a wash-stand, which may be of any approved construction; and B, a clean-water reservoir in the form of a metal-lined drawer immediately under the bowl C, on a shelf, F, with a pump, D, and a spout, E, suspended from the top of the stand, and arranged in such manner that the water may be readily forced up into the basin. H is the waste or foul-water tank, also under the basin and below the tank B, to which a spout, G, from the bottom of the basin, extends through the reservoir B. This tank may be drawn out to be discharged of the water, or it may have a discharge-spout connected to it; but, preferably, it will be taken out, so that it may be cleaned from time to time, as needed.

It is not essential that the said reservoir be directly under the basin, but I prefer to so arrange them.

Having thus described my invention, I claim as new and desire to secure by Letters Patent—

A wash-stand bearing removable reservoirs vertically arranged for clean water and waste water, a pump and a pipe for forcing the clean water into the basin, and a spout leading therefrom to the waste-water reservoir, all combined and arranged substantially as specified.

H. J. RUTHRAUFF.

Witnesses:
D. A. JOHNSON,
E. A. DULIN.